(12) United States Patent
Witowski (10) Patent No.: US 12,260,198 B2
(45) Date of Patent: Mar. 25, 2025

(54) COMPUTER-IMPLEMENTED METHOD FOR GENERATING A LINKER CODE FOR A GENERATION PROCESS OF AN EXECUTABLE CODE FOR A PROCESSING UNIT FROM A SOURCE CODE

(71) Applicant: Robert Bosch GmbH, Stuttgart (DE)

(72) Inventor: Jens Witowski, Freiberg Am Neckar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 285 days.

(21) Appl. No.: 17/829,648

(22) Filed: Jun. 1, 2022

(65) Prior Publication Data

US 2022/0398076 A1 Dec. 15, 2022

(30) Foreign Application Priority Data

Jun. 11, 2021 (DE) ...................... 10 2021 205 958.9

(51) Int. Cl.
*G06F 8/41* (2018.01)
*G06F 8/54* (2018.01)

(52) U.S. Cl.
CPC ................ *G06F 8/447* (2013.01); *G06F 8/54* (2013.01)

(58) Field of Classification Search
None
See application file for complete search history.

(56) References Cited

U.S. PATENT DOCUMENTS

| | | | | |
|---|---|---|---|---|
| 6,343,378 | B1 * | 1/2002 | Moroda | G06F 8/54 |
| | | | | 717/162 |
| 6,925,630 | B1 * | 8/2005 | Britton | G06F 16/288 |
| | | | | 717/106 |
| 2004/0098709 | A1 * | 5/2004 | Kyo | G06F 8/447 |
| | | | | 712/22 |
| 2008/0028474 | A1 * | 1/2008 | Horne | H04L 9/3226 |
| | | | | 726/27 |
| 2010/0333070 | A1 * | 12/2010 | Farnsworth | G06F 11/3457 |
| | | | | 711/170 |
| 2012/0057412 | A1 * | 3/2012 | Romanovskyy | G11C 8/10 |
| | | | | 365/230.06 |
| 2012/0311530 | A1 * | 12/2012 | Graviers | G06F 8/447 |
| | | | | 717/107 |
| 2017/0352399 | A1 * | 12/2017 | Yokoyama | G11C 11/4085 |
| 2021/0318955 | A1 * | 10/2021 | Li | G06F 12/0646 |
| 2021/0357194 | A1 * | 11/2021 | Guo | G06F 8/315 |

* cited by examiner

*Primary Examiner* — Jason D Mitchell
(74) *Attorney, Agent, or Firm* — NORTON ROSE FULBRIGHT US LLP; Gerard A. Messina (57) ABSTRACT

A computer-implemented method for generating linker code for generation process of executable code for a processing unit from a source code, in particular in a control unit of a vehicle. The control unit includes at least one memory unit each including at least one memory area in each case, and a processor unit including at least one processor core. As a function of predefined pieces of information relating to the memory areas of the processing unit, a predefined configuration of the existing memory areas as to which applications are assigned to which memory areas, and a predefined configuration of the macros which describe accesses of applications to memory areas according to specific properties, data arrays are generated, according to which an initialization of the memory areas takes place.

18 Claims, 2 Drawing Sheets

COMPUTER-IMPLEMENTED METHOD FOR GENERATING A LINKER CODE FOR A GENERATION PROCESS OF AN EXECUTABLE CODE FOR A PROCESSING UNIT FROM A SOURCE CODE

FIELD

The present invention relates to a computer-implemented method for generating a linker code for a generation process of an executable code for a processing unit from a source code, in particular for a control unit of a (motor) vehicle, a computer-implemented method for generating an executable code from a source code, in particular for a control unit of a (motor) vehicle, a computer-implemented method for operating a processing unit, in particular of a control unit of a (motor) vehicle, as well as a processing unit and a computer program for carrying it out.

BACKGROUND INFORMATION

During the course of a generation process or a so-called build process, executable code is generated from source code. In the present context, source code is understood to be, in particular, a code which is written in a high-level language or a high-level programming language, e.g., in C, C++, JAVA etc., and which may not be understood and executed by a processor unit. However, the compiled executable code is to be viewed, in particular, as a machine code, which may be executed directly by a processor unit.

During the course of a generation or build process of this type, the particular source code is usually initially compiled. Symbolic addresses of functions, variables, constants, etc. in the correspondingly compiled code are converted by a so-called linker into specific physical memory addresses (linking). A linking operation of this type is controlled by linker code, which may be extremely large and complex and may include several thousands of lines of code.

The source code compiled and assigned in this manner ("linked") represents the executable code. During the execution of this executable code, the corresponding functions, variables, constants, etc. are accessed with reference to the physical memory addresses assigned in each case.

SUMMARY

In accordance with the present invention, a computer-implemented method for generating a linker code for a generation process of an executable code for a processing unit from a source code, in particular for a control unit of a (motor) vehicle, a computer-implemented method for generating an executable code for a processing unit from a source code, in particular for a control unit of a (motor) vehicle, a computer-implemented method for operating a processing unit, in particular of a control unit of a (motor) vehicle, as well as a processing unit and a computer program for carrying it out, are provided. Advantageous embodiments of the present invention are disclosed herein. Advantages and preferred embodiments of the method according to the present invention are derived from the present description in an analogous manner.

The present invention provides a possibility for easily generating a linker code or a linker control code or a linker computer program, on which the linker is based. A linker code or linker control code is understood to be, in particular, a code or computer program, which controls a linker or linker process during the course of a generation or build process for generating the executable code from the source code. In particular, the present method provides a script or a code generator script, which may automatically generate the linker code, in particular, based on predefined pieces of information and configurations with respect to the processing unit, on which the executable code is to be executable.

The processing unit or the control unit, on which the executable code is to be executable, includes at least one memory unit, which has at least one memory area in each case, and a processor unit, which includes at least one processor core. These memory units are each designed, in particular, as a volatile memory unit, in particular as a RAM memory, or as a non-volatile memory unit (e.g., ROM, flash). A memory area of a memory unit of this type is to be understood in the present context, in particular, as a certain section or part of the particular memory unit. In particular, a particular memory unit or the entire memory capacity of the memory unit may be conceptually divided into a multiplicity of individual memory areas. A memory area may be, for example, a single memory address, under which a specific piece of data is stored, or also a multiplicity of memory addresses of this type.

In accordance with an example embodiment of the present invention, to generate the linker code, pieces of information relating to the memory areas of the control unit are predefined, in particular, pieces of information about the existing memory units and their properties and thus about the hardware resources present in the control unit. For example, a list of all memory modules present in the control unit and their specific properties or features may be predefined. For example, these pieces of information may be predefined in advance by a user or operator.

Moreover, in accordance with an example embodiment of the present invention, configurations of the existing memory areas may be predefined, indicating which applications are assigned to which memory areas. Project-specific or control unit-specific requirements of the control unit may be configured as a function of the predefined pieces of information relating to the memory areas, which describe generally relevant pieces of information about the available hardware resources of the control unit. In particular, control unit-specific applications, tasks or programs, which are carried out by the executable code during regular operation of the control unit, are to be understood as applications of this type. In particular, the memory areas, which the applications are able to access during their execution, are predefined during the course of the configuration. For example, a map of the resource distribution may be generated during the course thereof, based on the overall system of the control unit. For example, a division of the individual memory units or a combination or grouping of individual memory areas may be carried out during the course of this configuration. For example, this configuration of the memory areas may also be predefined in advance by a user or operator.

In particular, in accordance with an example embodiment of the present invention, macros are defined or configured, which describe accesses of applications to memory areas according to specific properties. Macros are generally understood to be a sequence of instructions or declarations combined under a certain designation or a certain macro name for the purpose of being able to execute them instead of corresponding individual instructions using only one simple call. In the present case, the macros contain, in particular, code or linker code for locating functions, variables or constants based on pragma or compiler instructions which are carried out by the corresponding compiler. The configuration of these macros may also be advantageously predefined in advance by a user or operator.

In particular, a specific nomenclature may be defined within the scope of the configuration of the macros. This nomenclature relates, in particular, to a comprehensible, unique and calculable (macro) naming for the access of applications to corresponding memory areas and thus for the location of functions, variables, constants, etc. This nomenclature is also to be referred to in the present context as a "linker label."

Within the scope of the method in accordance with an example embodiment of the present invention, the code generator script automatically generates the linker code as a function of the predefined pieces of information relating to the memory areas of the control unit, as a function of the predefined configuration of the existing memory areas and as a function of the predefined configuration of the macros, in particular as a function of the defined nomenclature.

For this purpose, data arrays are generated as a function of the predefined pieces of information relating to the memory areas of the control unit, as a function of the predefined configuration of the existing memory areas and as a function of the predefined configuration of the macros, in particular as a function of the defined nomenclature, according to which an initialization of the memory areas takes place. These data arrays are, in particular, automatically generated by the code generator script. A data array is to be understood, in particular, as a data structure variant, with the use of which identically structured data may be processed. The data arrays are each advantageously generated as (RAM) initialization routines or as sequences of instructions for carrying out corresponding subtasks. Such an initialization of the memory areas takes place, in particular, during the course of a regular startup or power-on of the control unit or furthermore, in particular, during the course of a restart or resetting of the particular memory unit or the entire control unit, for example, after an error occurs in the control unit. In particular, pieces of information about the available RAM areas and their properties as well as, in particular, about which applications were configured in which RAM areas. With the aid of these pieces of information, the particular arrays are generated by the code generator script, which may take into account a particular initialization behavior, in particular, individually for each processor core. The nomenclature defined for the data arrays during the course of the macro configuration is particularly advantageously used for the accesses of applications to memory areas.

In addition, generic macros, which each describe accesses of a specific application to a specific memory area according to specific properties, are generated as a function of the predefined pieces of information relating to the memory areas of the control unit, as a function of the predefined configuration of the existing memory areas and as a function of the predefined configuration of the macros, in particular as a function of the defined nomenclature. The generic macros are advantageously automatically generated by the code generator script. These macros are generated, in particular, according to the defined nomenclature and thus according to a predefined name rule. In particular, this name rule may be made up of a designation for the specific properties, the specific memory area or RAM module as well as the name of the application. The specific properties may describe, for example, an initialization behavior of a correspondingly addressed variable.

The generic macros are thus generated by the code generator script, in particular as program code, which are replaced by a larger program code in an interpreter or preprocessor. Recurring program structures of the memory accesses may thus be simplified by the corresponding macro name or the macro nomenclature. In particular, the RAM module name, application name and access properties may thus be transferred by the generic macros. In particular, hooks or program code extensions and RAM initialization code may also be generated in keeping with the particular macro.

A final macro is generated in each case for each memory unit, which includes the generic macros which relate to the memory areas of this particular memory unit. These final macros are also advantageously automatically generated by the code generator script. For each memory unit or for each RAM module, a final macro is thus generated, in which the generic macros for all applications assigned to this memory unit are called. A particular final macro is also advantageously generated for memory areas or RAM modules which are not accessed by any application, in particular, however, without contents.

The linker code or the linker computer program, on which the linker is based, is generated, advantageously automatically by the code generator script, as a function of the final macros and as a function of the data arrays. The linker code may be generated, in particular, based on internal data and may employ all macros which are needed or used. In addition, the linker code may also include a superset of all macros, so that a change to the linker code is advantageously not necessary after each configuration change. The generation process of the executable code may also be carried out from the source code with the aid of the generated linker code. In particular, specific physical memory addresses may thus be assigned to all accesses of the executable code to functions, variables, constants, etc.

The present method thus provides a possibility for automatically generating a linker code or a linker computer program, based on pieces of information which describe the particular target control unit. The method may be particularly advantageously implemented as a script or a code generator script. The RAM initialization routines and the pieces of information for the linker code are particularly advantageously generated with the aid of the same script or code generator script to ensure consistency.

The complexity and effort for generating the linker code may be reduced, in particular, by using macros and thus by an additional abstraction in the linker syntax. The linker code or the linker computer program as well as the RAM initialization routines may furthermore be generated dependent on each other, by which a consistency between them may be ensured. An error probability due to inconsistencies between the linker code and RAM initialization routines may be minimized. The linker code or the linker computer program may be generated consistently, clearly and with as little complexity as possible.

Due to the abstraction of the linker syntax or the linker code syntax with the aid of macros, project-specific extensions, in particular, in individual sections as well as, in particular, global extensions, are made possible. In addition, the linker code and RAM initialization routines may be generated, based on the same database regarding the existing hardware and its specific configuration. In the generated linker code or linker computer program, the generic macro names are advantageously called multiple times for each RAM application and thus combined with the abstraction of the linker syntax or linker code syntax.

In modern control units, multiple RAM areas having different initialization points in time are usually required, in particular, according to a type of program start or initialization or a reset. For example, program starts of this type include a first-time, regular start of the control unit, a trap case, after an illegal command was detected by the hardware, and a software reset, if an illegal path in the software was diagnosed. Accordingly, variables usually exist, whose RAM initialization varies, in particular, depending on the program start or reset carried out. Corresponding information may usually not be transferred by the linker code to the compiler, so that this differentiation in the linker code may usually not be automated. During the course of the method, at least a portion of the RAM initialization routines is therefore particularly advantageously generated by code which has a dependency on the linker code.

In addition to grouping variables according to the reset type or initialization type, each group is further divided, in particular, with regard to the initialization value. A distinction is made, in particular, between variables which are initialized with the value zero and variables which require a specific value not equal to zero for initialization. In the latter case, the specific initialization values are stored, in particular, in a flash memory and copied from there to the RAM memory upon startup.

Modern control units may include a multiplicity of memory units, for example up to 30 different RAM modules. Moreover, at least six sections may be provided for each RAM module, namely three sections for the different reset or initialization types and two more sections per initialization type for the different initialization values (zero or specific value). It is also possible to distribute the RAM initialization in control units to multiple processor cores, by which an amount of time for the initialization may be reduced. In addition, it is possible to divide the control unit system into partitions to be able to separate individual software areas from each other in different partitions. These different factors may be particularly advantageously taken into account when generating the linker code during the course of the present method.

The pieces of information relating to the memory areas of the control unit advantageously include pieces of information relating to a number of the memory areas and/or a size of the individual memory areas and/or physical memory addresses of the individual memory areas. The physical memory addresses may each include, in particular, a start and/or an end address of the particular memory area. In particular, the physical properties of the particular memory modules may thus be described.

Alternatively or additionally, the pieces of information preferably include information relating to a number of the processor cores present in the control unit and/or relating to initialization properties of the individual memory areas, in particular relating to which processor cores initialize which memory areas. The memory initialization may be distributed, for example, to different processor cores for the purpose of reducing a startup time. The pieces of information advantageously describe which processor core or which processor cores carries/carry out the initialization of the individual memory or RAM areas.

Alternatively or additionally, the pieces of information preferably include pieces of information relating to initialization types or reset types of the individual memory areas, in particular whether the individual memory areas may each be initialized or restarted after a regular power-on of the control unit (so-called "power-on reset") and/or in the case of a detected software error (so-called "software reset") and/or in the case of a detected hardware error (so-called "trap reset"). The triggering event which may result in a restart or reset may thus advantageously be predefined for each memory area.

The existing memory areas are advantageously configured in such a way that partitions are created and the individual memory areas are each assigned to a partition. The available memory areas of the individual memory units or RAM modules may be advantageously assigned partially or entirely exclusively to a particular partition and used only thereby. These memory areas are then no longer accessible to other partitions.

In accordance with an example embodiment of the present invention, the macros are preferably configured or defined as a function of pragmas. Control instructions for the compiler inserted into a source text are to be understood as pragmas of this type or compiler instructions. The macros advantageously include linker code for locating variables based on their pragmas, which are appended by the compiler. The macros use, in particular, a fixed name rule for filtering the pragmas.

Pragma extensions are preferably configured or defined in the macros during the course of configuring the macros. In particular, global extensions for all macros may be introduced by configuring pragma extensions of this type. Further pragma filters may thus be advantageously inserted into the macros.

Different data arrays for different initialization types are advantageously generated, in particular automatically by the code generator script, for each processor core of a control unit. These initialization types or reset types include, in particular, a regular startup (so-called "power-on reset"), an initialization or reset in the case of a known software error (so-called "software reset"), in particular if an illegal path in the software was diagnosed, and furthermore, in particular, an initialization or reset in the case of a detected hardware error (so-called "trap reset"), in particular, if an illegal command was detected by the hardware. Corresponding data arrays are thus advantageously generated in each case for each processor core and for each different initialization behavior.

Different data arrays for different initialization values are advantageously generated in each case for each initialization type, in particular automatically by the code generator script. In particular, two arrays are generated for each reset or initialization type, a first array for an initialization using the value zero, and a second array for an initialization using a specific value not equal to zero. A start address of this specific value in a non-volatile memory unit of the control unit is advantageously transferred.

According to one preferred specific embodiment of the present invention, the specific properties of the generic macros each include an initialization type, according to which the particular specific memory area may be initialized, and/or an initialization value, with the aid of which the particular specific memory area is to be initialized. In particular, the generic macros thus define the triggering events, under which a particular memory area may be initialized when a particular application accesses this memory area, and the initialization value, with the aid of which this memory area is initialized.

The macros characterizing the memory units, which each describe a start address, an end address and a size of the individual memory units, are preferably generated as a function of the predefined pieces of information relating to the memory areas of the control unit. These characterizing macros are also advantageously automatically generated by the code generator script. The linker code is furthermore preferably generated as a function of these macros characterizing the memory units. If a partitioning of the memory units is activated, a corresponding reduction takes place for the individual memory units, based on the configuration of the partitioning.

According to one particularly preferred specific embodiment of the present invention, a consistency between the final macros and the data arrays is checked, in particular, automatically by the code generator script. For this purpose, a data file including linker code commands may be generated, for example based on the available resources and configuration, for the purpose of checking that all expected nomenclatures or linker labels are present and that the linker code as well as the RAM initialization is consistent. The same data set may thus advantageously be used for the RAM initialization and for safeguarding the linker codes. In particular, a security prompt in linker syntax is generated for all available memory areas and their properties as well as depending on which applications were configured in which RAM area. A linker check code may be generated with the aid of these pieces of information. This code advantageously checks, according to the configuration, all nomenclatures or linker labels used for the RAM initialization to see whether they were created and have a correct alignment. In the case of an inconsistency, the linker code may abort the build process, for example, using a corresponding error message.

The present invention furthermore relates to a method for generating an executable code from a source code, in particular for a control unit of a vehicle. The source code is compiled. Symbolic memory addresses in the compiled code are converted into physical memory addresses with the aid of a linker code, which was generated according to one advantageous specific embodiment of the present invention. The executable code is generated as a function of these physical memory addresses and the compiled code. In particular, the specific physical memory addresses are thus assigned to all accesses of the executable code to functions, variables, constants, etc. The complexity and effort for the generation process of the executable code may be reduced with the aid of the automatically generated linker codes. Due to the simple, clear and consistent structure of the linker code, in particular, a consistent and reliable conversion of the symbolic memory addresses into the physical addresses may be made possible with the aid of macros.

As a function of the final macros, in particular as a function of the generic macros of the linker code, a symbolic memory address may be converted into a physical memory address in each case for the access of a specific application to a specific memory area according to specific properties. In particular, during the course of the generation process or, in particular, during the course of the link process, the final or generic macros, which describe these accesses of the particular application, may be replaced by a corresponding larger program code using an interpreter or preprocessor.

The present invention further relates to a method for operating a processing unit, in particular a control unit of a vehicle, an executable code being executed in the processing unit, which was generated according to one advantageous specific embodiment of the present invention. Since the executable code was thus generated with the aid of a linker code according to one advantageous specific embodiment of the present invention, the executable code includes, in particular, consistent and reliably assigned or converted physical memory addresses. Errors in executing applications with the aid of the executable code, in particular, erroneous memory addresses or erroneous addressing of memory areas, may be avoided.

Due to the executable code, applications advantageously access specific memory areas according to specific properties in each case, these specific memory areas being addressed with the aid of physical memory addresses, which were generated in the executable code with the aid of a linker code, which was generated according to one advantageous specific embodiment of the present invention. Due to the applications, functions of the control unit are thus advantageously carried out, for example during the course of an engine control or during the course of safety-critical vehicle functions. Errors in carrying out control unit functions of this type, e.g., due to erroneous physical memory addresses or due to erroneous addressing of memory areas, may, in particular, be avoided.

A processing unit according to the present invention, e.g., a PC or programming device or a control unit of a motor vehicle, is configured to carry out a method according to the present invention, in particular from a programming point of view.

It is also advantageous to implement a method according to the present invention in the form of a computer program or computer program product, including program code, to carry out all method steps, since this is particularly cost-effective, in particular when an executing control unit is used for other tasks and is thus present anyway. Suitable data carriers for providing the computer program are, in particular, magnetic, optical and electrical memories, such as hard disks, flash memories, EEPROMs, DVDs, among other things. Downloading a program via computer networks (Internet, intranet, etc.) is also possible.

Further advantages and embodiments of the present invention are derived from the description and the figures.

The present invention is schematically illustrated in the figures on the basis of exemplary embodiments and described below with reference to the figures.

DETAILED DESCRIPTION OF EXAMPLE EMBODIMENTS

Figure 1:
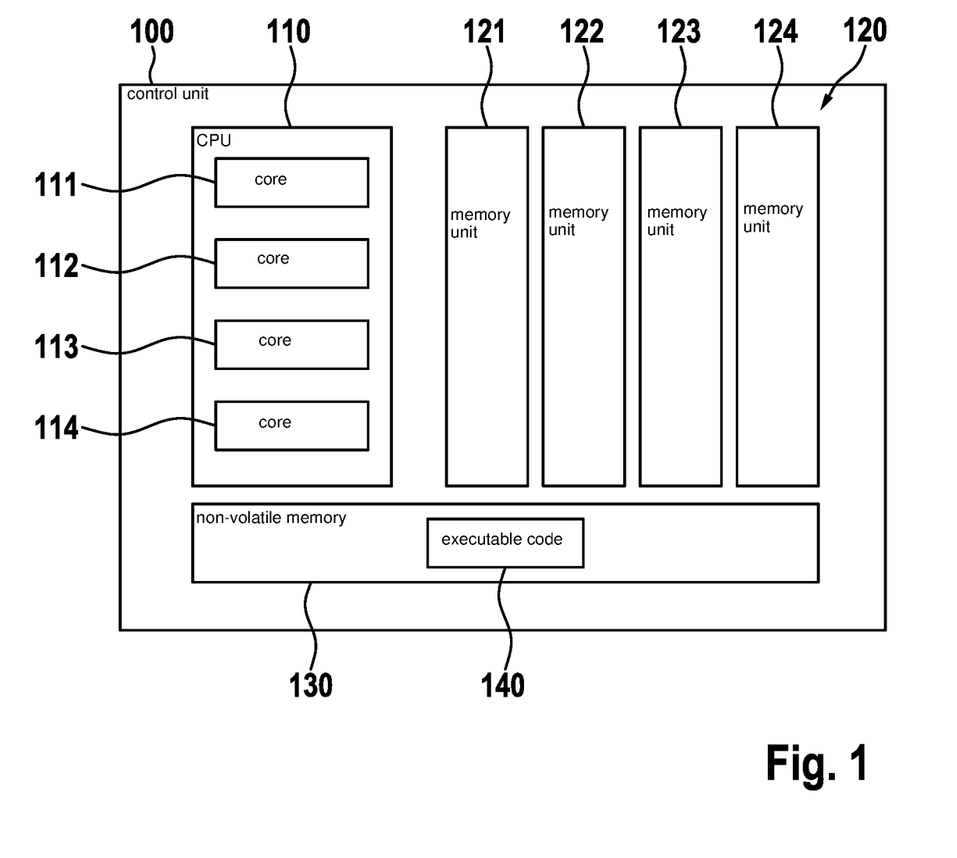
FIG. 1 schematically shows a control unit of a (motor) vehicle, including an executable code, which may be generated according to one preferred specific embodiment of the method according to the present invention.

A processing unit in the form of a control unit of a (motor) vehicle is schematically illustrated in FIG. 1 and identified by 100, for example an engine control unit or a control unit for carrying out safety-critical vehicle functions, for example, during the course of autonomous driving.

Control unit 100 includes a processor unit or CPU 110 including a multiplicity of processor cores 111, 112, 113, 114. Control unit 100 further includes volatile memory units 120, in particular a multiplicity of RAM memories or RAM modules 121, 122, 123, 124. Each of these memory units 121, 122, 123, 124 may include a multiplicity of memory areas, the particular memory unit 121, 122, 123, 124 or its memory capacity being able to be divided or grouped into a multiplicity of individual memory areas. Control unit 100 further includes a non-volatile memory unit 130, for example, a flash memory.

The number of processor units and processor cores as well as the memory units are selected as examples in FIG. 1 for reasons of clarity. It is understood that control unit 100 may also include further processor units or processor cores as well as further memory units. It is also understood that control unit 100 may include further elements, for example a memory protection unit (MPU), a memory management unit (MMU), connections for a network or a field bus, data inputs, data outputs, etc.

An executable code 140 is stored in flash memory 130, for example, a computer program for carrying out functions of control unit 100, for example, during the course of an engine control or during the course of safety-critical vehicle functions.

During the course of the execution of code 140, different applications of code 140 access different memory areas of RAM memory 120 with the aid of corresponding physical memory addresses.

Executable code 140 is based on a source code, which may be converted into executable code 140 during the course of a generation process by compiling and linking. Symbolic addresses of functions, variables, constants, etc. in the corresponding compiled code are converted by a linker code into specific physical memory addresses.

During the course of one preferred specific embodiment of a method according to the present invention, a linker code of this type is automatically generated to be able to convert the corresponding source code into executable code 140, as explained below, based on FIG. 2.

Figure 2:
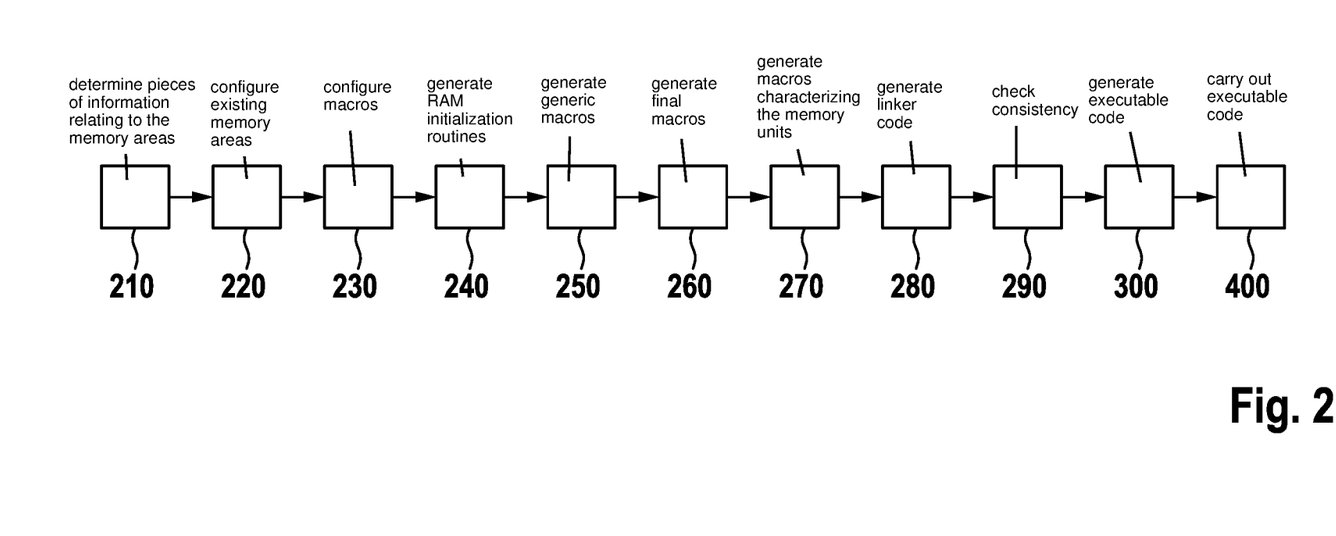
FIG. 2 schematically shows one preferred specific embodiment of the method according to the present invention as a block diagram.

FIG. 2 schematically shows one preferred specific embodiment of the method according to the present invention as a block diagram.

The method may be computer-implemented as a script or code generator script, e.g., based on Java. RAM initialization routines and pieces of linker information may be generated with the aid of this script for the purpose of ensuring a consistency therebetween. A complexity of the linker code or the linker computer program may be reduced by an abstraction of the linker code syntax or linker syntax in the form of preprocessor macros. An effort for manually generating the linker code may be reduced, and an error probability due to an inconsistency between RAM initialization routines and the linker code may be minimized.

In a first step 210, pieces of information relating to the memory areas of RAM memory units 120 of control unit 100 are determined.

In particular, a list of all supported RAM modules and their properties is transferred to the code generator script. This list is, in particular, specific to the control unit. For example, lists of this type may be provided for each supported microcontroller or microprocessor. The corresponding list of requested hardware variants is used during the build process.

For example, these pieces of information relate to the number, size and physical memory addresses of the memory areas. Physical properties of the individual RAM modules include, in particular, a start address and an end address. This information is used in the linker code to generate the memory areas.

The pieces of information further relate to an initialization type of the individual memory areas. A further property of a RAM module is the support of the possible reset or initialization types. These may relate to, for example, a regular power-on ("power-on reset," "PoRst"), an initialization or a reset in the case of a detected software error ("software reset," "SwReset") as well as an initialization or a reset in the case of a detected hardware error ("trap reset," "TrapRst").

RAM modules often facilitate specific RAM addressing methods, e.g., a so-called small or Abs18 addressing. This information may, for example, also be transferred to the code generator script.

In addition, the pieces of information may relate to which processor core carries out the RAM initialization. To reduce a startup time, it may be more efficient to distribute the RAM initialization to different processor cores.

For example, hardware-specific extensions of the addressing methods may also be managed in the list of the pieces of information.

For example, the list containing the pieces of information relating to the memory areas may have the following appearance:

| // CoreNumber(for Init) | RamInitGeneration | RamAddressMethod |
|---|---|---|
| // ------------- | ----------------- | ----------------- |
| // 0-5 Core0-5 | 0x00 No Init | 0x01 Normal (absolute) addressing |
| // 16 each Core | 0x01 SwReset | 0x02 Small addressing |
| // 255 not relevant | 0x02 SwReset, Trap | 0x03 Abs18 addressing |
| // | 0x03 SwReset, Trap, PowerOn | |

```
//
public List<RbaMemLayExport> getRAM ( ) {
exportArray.add(new RbaMemLayRAM("RAM0",
0x70004000, 0x7003BFFF,0,0x02,0x1));
exportArray.add(new RbaMemLayRAM("RAM1",
0x60004000, 0x6003BFFF,1,0x02,0x1));
exportArray.add(new RbaMemLayRAM("RAM2",
0x50004000, 0x50017FFF,2,0x02,0x1));
}
```

The list may advantageously be arbitrarily expanded, in particular, based on the hardware properties of the RAM modules as well as control unit-specific or project-specific requirements.

A configuration is now carried out, depending on this list. This configuration may be divided, for example, into two parts, a resource configuration, which is carried out in a step 220, and a macro configuration, which is carried out in a step 230, as explained below.

In step 220, the existing memory areas are configured as to which applications are assigned to which memory areas, as a function of these pieces of information. In particular, the existing memory areas are configured in such a way that partitions are created and individual memory areas are each assigned to a partition.

To facilitate the division into different partitions, the available areas of the RAM modules are partially or entirely exclusively assigned to one partition and removed for other partitions.

It is possible for the user to specify the configuration for each RAM area as to whether and to what extent a reduction is to take place. If a RAM area is not contained in this part of the configuration, the entire area is unavailable. For example, a different processor core may be necessary for the RAM initialization, which may also be configured in step 220.

A so-called safeguard method may be used to divide specific software parts within a partition. This means that, in particular, multiple operating system applications may be carried out in parallel within one partition. For this purpose, for example, the number of available sections is multiplied by the number of configured applications (e.g., according to the ASIL level or from different suppliers) for each RAM area. The sections of the applications may be configured without a resource limitation and be easily arranged one after the other. The shielding from other applications takes place, for example, with the aid of a linker nomenclature or so-called linker labels, which are generated by macros. These linker labels are flexible, since the linker labels may be used in the code, and the absolute values are received only after the link run. A monitoring of the delimitation of the RAM areas of the applications may take place with the aid of hardware, e.g., with the aid of an MPU and/or MMU, or also with the aid of software methods. The sequence in which the applications are relatively situated one after the other may be configured, for example in that each application configures one index per RAM area. The code generator script sorts the individual applications in the memory area according to this index.

Macros are configured in step 230, which describe accesses of applications to memory areas according to specific properties. In particular, a nomenclature or corresponding linker labels are defined. The macros may be configured as a function of pragmas, and pragma extensions may furthermore be configured in the macros.

The macros contain linker code for locating variables based on their pragmas, which are appended by the compiler. The macros use a fixed name rule for filtering the pragmas, which may be made up, for example, of the following:
<RAM name>.<application name>.<reset type>.<variable type>

To be able to provide individual extensions for different projects, mechanisms may be provided in the form of preprocessor hooks (#defines) and additional pragma name rules.

Each macro is generated, in particular, including a fixed preprocessor hook, which follows a fixed name rule and may be made up, for example, of the following:
RELOCATION_<RAM name>_<application name>_<reset type>_<variable type>

Each macro may be defined in a header file in a control unit-specific or project-specific manner. Moreover, extensions may be added to the linker syntax in the header file.

Since the linker code or the linker computer program and its macros are preprocessed in the build process, the exchange of the preprocessor hooks with the control unit-specific or project-specific contents then takes place. In this way, different extensions may be introduced for each macro. In particular, the macros are limited only by the linker syntax of the compiler used.

If global extensions are to be introduced, in particular for all macros, additional pragma extensions may be configured. In this way, further pragma filters may be inserted into the macros. The corresponding name rule may be made up, for example, of the following:
<RAM name>.<application name>.<extension>.<reset type>.<variable type>.

For this purpose, corresponding linker labels may be generated before and after the locating, so that they may also be handled separately (e.g., initialized, shielded, etc.).

Steps 210, 220, 230 may be carried out, for example, by a user. In these steps, pieces of information relating to the memory areas of the control unit are thus predefined for the code generator script and also a configuration of the existing memory areas as to which applications are assigned to which memory areas, and a configuration of macros, which describe accesses of applications to memory areas according to specific properties.

RAM initialization routines are generated in a step 240. In step 240, data arrays are generated as a function of the predefined pieces of information relating to the memory areas of the control unit, as a function of the predefined configuration of the existing memory areas and as a function of the predefined configuration of the macros, in particular as a function of the defined nomenclature, according to which an initialization of the memory areas takes place. In particular, different data arrays for different initialization types are generated for each processor core of the control unit. Moreover, different data arrays for different initialization values are generated for each initialization type.

Based on steps 210, 220 and 230, the code generator script includes, in particular, a list of the available RAM areas and their properties as well as a list of which applications were configured in which RAM area.

With the aid of these pieces of information, the script generates arrays for each core and each different initialization behavior. These arrays are used, in particular, by a routine for initializing the RAM. Linker labels are used in the arrays, which result depending on the RAM area and the name of the application. In particular, start and size labels are stored in the array. The absolute addresses of each section may thus be shifted, without the array content having to be changed, since linker labels are replaced by the values after the link run in the ELF or hex file.

These arrays are used, in particular, by static functions to describe the corresponding areas with initialization values. The assigned array including linker labels is used for this purpose according to the reset or initialization types. In particular, two arrays are provided for each reset or initialization type, a first array for an initialization using zero, and a second array for an initialization using a specific value not equal to zero. In the latter case, a start address of the specific value, which is stored in a flash memory, is transferred together with a linker label. Static functions of this type are provided for each processor core and for each of the initialization types. The corresponding static function is carried out to start the system.

The macros are generated in steps 250 and 260. Generic macros are initially generated in step 250 and final macros in step 260.

In particular, all macros are generated according to the same principle, in particular, according to a fixed name rule, which is made up, for example, of the initialization behavior of the variables, the reset property, the RAM module and the application name. Hooks and RAM initialization code may be advantageously generated thereby, which fit these linker code macros.

In step 250, generic macros, which each describe accesses of a specific application to a specific memory area according to specific properties, in particular, the reset or initialization type and/or the initialization value, are generated as a function of the pieces of information relating to the memory areas of the control unit, as a function of the configuration of the available memory areas and as a function of the configuration of the macros, in particular, as a function of the defined nomenclature.

Generic macros or default macros for the location in the RAM memory are thus generated for the two initialization variants (zero or specific value). For example, the RAM module name, the application name and reset property are transferred as parameters in these generic default macros, and are thus generic. The contents of the generic macros include, in particular, a start linker label, a generic preprocessor hook, a pragma filter as well as an end linker label.

For example, a generic macro for a variable initialized with the value zero may be generated as follows:

```
#define TEMPLATE_LINK_BSS (RamName, Reset, AppName) \
.bss. <RamName>.<AppName>_<Reset> : {              \
__<RamName>_<AppName>_<Reset>_BSS_START = .;       \
RELOCATION_,<RamName>,<AppName>_<Reset>_BSS)       \
"(*(.bss. <RamName>.<AppName>.<Reset>))"           \
_<RamName>_<AppName>_<Reset>_BSS_END = .;          \
} > <RamName>
```

For example, if further hooks are configured, they are, in particular, inserted into the generic macros. In addition to manually introducing linker syntax, one application of a second hook could be, for example, to introduce machine-generated linker syntax, e.g., to optimize runtime. The configured pragma extensions may also be inserted into the generic macro. A specific additional area may represent an application, e.g., specific protected variables in this area. In particular, additional start and end linker labels may be generated for each pragma extension.

For example, a generic macro for a variable initialized with zero may be generated as follows:

```
#define TEMPLATE_LINK_BSS (RamName, Reset, AppName)          \
.bss. <RamName>. <AppName>_<Reset> : {                        \
__<RamName>_<AppName>_<Reset>_BSS_START = .;                  \
RELOCATION_,<RamName>,_,<AppName>_<Reset>_BSS)                \
RELOCATION_,<RamName>,_,<AppName>_HOOK1_<Reset>_BSS)          \
"(*(.bss. <RamName>.<AppName>.<Reset>))" \
__<RamName>_<AppName>_ Pragma_Extension1_<Reset>_BSS_START = ..\
"(*(.bss. <RamName>.<AppName>.Pragma_Extension1.<Reset>))" \
__<RamName>_<AppName>_ Pragma_Extension1_<Reset>_BSS_END = .. \
__<RamName>_<AppName>_ Pragma_Extension2_<Reset>_BSS_START = ..\
"(*(.bss. <RamName>.<AppName>.Pragma_Extension2.<Reset>))" \
__<RamName>_<AppName>_ Pragma_Extension2_<Reset>_BSS_ END = .. \
__<RamName>_<AppName>_<Reset>_BSS_END = .;                    \
} > <RamName>
```

In step 260, final macros are generated as a function of the generic macros. A final macro is generated in each case for each memory unit, which includes the generic macros which relate to the memory areas of the particular memory unit.

A further macro is thus generated for each RAM module, where the generic macros are called for all applications belonging to this RAM. The macros are advantageously expanded accordingly, depending on which reset behavior the particular RAM memory unit supports.

For RAM modules which are not used by any application, final macros are advantageously also generated, in particular, without contents.

An example of a control unit including four RAM memory units and two applications is examined below:
RAM1 with App1; ResetType: SwReset. TrapRst, PoRst
RAM2 with App1 and App2; ResetType: SwReset.
RAM3 with App1; ResetType: SwReset.
RAM4 is not used.

For example, the following final macros may be generated in this case:

```
#define TEMPLATE_LINK_BSS_RAM1                  \
   TEMPLATE_LINK_BSS (RAM1, SwReset, App1)      \
   TEMPLATE_LINK_BSS (RAM1, TrapRst, App1)      \
   TEMPLATE_LINK_BSS (RAM1, PoRst, App1)
#define TEMPLATE_LINK_BSS_RAM2                  \
   TEMPLATE_LINK_BSS (RAM2, SwReset, App1)      \
   TEMPLATE_LINK_BSS (RAM2, SwReset, App2)
#define TEMPLATE_LINK_BSS_RAM3                  \
   TEMPLATE_LINK_BSS (RAM3, SwReset, App2)
#define TEMPLATE_LINK_BSS_RAM4
```

To reduce, in particular minimize, an effort for manually generating the preprocessor hooks, the script also generates, for example, default hooks, which are necessary due to the generated macros. These default hooks, in particular, do not contain any linker code and are needed, in particular, so that the preprocess does not abort if a hook is not defined.

In particular, at most only the macros are thus generated manually, into which a project-specific extension is to be introduced. To avoid a double definition of the hooks, it is first checked for the default hook, in particular, whether a corresponding manually generated preprocessor hook already exists. The hook is generated only if this is not the case.

For example, hooks may be generated as follows:
```
#ifndef RELOCATION_RAM1_APP1_SWRESET_BSS
#define   RELOCATION_RAM1_APP1_SWRESET_BSS
#endif
```

The generated hooks are stored, for example, in a separate file, since, in particular, an include sequence in the linker code is relevant here. In particular, the manually generated preprocessor hooks are integrated before the generated hooks, since the #ifndef check may otherwise be removed, which may result in a double definition.

In step 270, macros characterizing the memory units are furthermore generated as a function of the pieces of information relating to the memory areas of the control unit. These macros each describe a start address, an end address and a size of the individual memory units.

If a partitioning is activated, a corresponding reduction takes place for the RAM modules, based on the configuration of the partitioning.

For example, a macro of this type may be generated as follows for a RAM memory unit:

```
/* MemLay layout configuration of RAM1 */
#define RBA_MEMLAY_RAM1_START    0x60000000
#define RBA_MEMLAY_RAM1_END      0x60010000
#define RBA_MEMLAY_RAM1_SIZE     0x10000
```

In step 280, the linker code is generated as a function of the final macros, the data arrays and the macros characterizing the memory units.

For example, the linker code may be generated according to two different possibilities. For example, a superset of all macros may be stored in the linker code, so that the linker code does not have to be regenerated each time the configuration is changed. The code generator script may also generate the linker code, based on the internal data, and employ only the macros which are actually used. In the first case, the development effort is slightly lower. In the second case, the linker code or the linker computer program is reduced to basic necessity and is clearer.

For example, the linker code or its computer program may be generated as follows.

```
#include "GeneratedMakrosFile.h"
#include "ManualHooksFile.h"
#include "GeneratedHooksFile.h"
MEMORY {
RAM1 : ORIGIN = RBA_MEMLAY_RAM1_START, LENGTH = RBA_MEMLAY_RAM1_SIZE
RAM2 : ORIGIN = RBA_MEMLAY_RAM2_START, LENGTH = RBA_MEMLAY_RAM2_SIZE
RAM3 : ORIGIN = RBA_MEMLAY_RAM3_START, LENGTH = RBA_MEMLAY_RAM3_SIZE
RAM4 : ORIGIN = RBA_MEMLAY_RAM4_START, LENGTH = RBA_MEMLAY_RAM4_SIZE
}
SECTIONS
{
TEMPLATE_LINK_BSS_RAM1
TEMPLATE_LINK_DATA_RAM1
TEMPLATE_LINK_BSS_RAM2
TEMPLATE_LINK_DATA_RAM2
TEMPLATE_LINK_BSS_RAM3
TEMPLATE_LINK_DATA_RAM3
TEMPLATE_LINK_BSS_RAM4
TEMPLATE_LINK_DATA_RAM4
}
```

The above example relates to a multi-core system including six processor cores and a partitioning, which is implemented on the first four cores. Each RAM module supports, for example, different reset types. Multiple operating system applications are supported with safeguard. The RAM initialization is distributed, for example, to the first four cores. The linker code uses the macros including the most important pieces of information with regard to the supported RAM modules. Further implementations of the configuration take place, for example, in macros which are replaced by the preprocessor having the linker syntax.

A consistency between the final macros and the data arrays is checked in a step 290.

For this purpose, the code generator script generates, for example, a file including linker commands, based on the available resources and configuration, for the purpose of checking whether all expected linker labels are present and that the linker code and the RAM initialization are thus consistent.

The code generator script advantageously uses the same data sets for initializing the RAM and for safeguarding the linker codes. A security prompt is generated in the linker syntax for all available RAM areas and their properties or features as well as with the aid of a list as to which applications were configured in which RAM area. The script generates, for example, a linker check code with the aid of these pieces of information. This code checks all linker labels used for the RAM initialization according to the configuration. In particular, it is checked whether these linker labels were created and whether they have the correct alignment. In the case of an inconsistency, the linker code may abort the build process, for example, using a corresponding error message.

In a step 300, the executable code to be executed on the control unit is generated from the source code with the aid of the generated linker code. This source code is compiled for this purpose, and symbolic memory addresses in the compiled code are converted into physical memory addresses. As a function of the final macros or as a function of the generic macros, symbolic memory addresses are converted into corresponding physical memory addresses for accesses by specific applications to specific memory areas according to specific properties. The executable code is generated as a function of these physical memory addresses and the compiled code.

In a step 400, the executable code is carried out in the control unit, so that functions of control unit 100 are carried out, for example, during the course of an engine control or during the course of safety-critical vehicle functions. During the course thereof, corresponding applications are carried out by the executable code, which access different memory areas of the RAM memory of the control unit with the aid of the corresponding assigned physical memory addresses.

What is claimed is:

1. A computer-implemented method for generating a linker code for a generating process for generating from a source code an executable code that is for a processing unit, the processing unit includes at least one memory unit, which each includes at least one memory area, and a processor unit which includes at least one processor core, the method comprising the following steps:
generating data arrays according to which an initialization of memory areas of the processing unit takes place, the data arrays being generated as a function of predefined pieces of information relating to the memory areas, as a function of a predefined configuration of the memory areas as to which applications are assigned to which of the memory areas, and as a function of a predefined configuration of macros which describe accesses of applications to the memory areas according to specific properties;
generating generic macros, which each describe accesses of a specific application to a specific memory area of the memory areas according to specific properties, the generic macros being generated as a function of the predefined pieces of information relating to the memory areas of the processing unit, as a function of the predefined configuration of the memory areas as to which applications are assigned to which memory areas, and as a function of the predefined configuration of the macros;
generating a final macro for each respective memory unit of the at least one memory unit, the final macro including the generic macros which relate to the memory areas of the respective memory unit; and
generating the linker code as a function of the final macros and as a function of the data arrays.

2. The method as recited in claim 1, wherein the processing unit is a control unit of a vehicle.

3. The method as recited in claim 1, wherein the pieces of information relating to the memory areas of the processing unit include pieces of information relating to:
a number of the memory areas; and/or
a size of each of the memory areas; and/or
physical memory addresses of each of the memory areas; and/or
a number of the processing cores; and/or
initialization properties of each of the memory areas, including as to which processor cores initialize which memory areas; and/or
initialization types of each of the memory areas, including as to whether the individual memory areas may each be initialized after a regular power-on of the processing unit and/or in the event of a detected software error and/or in the event of a detected hardware error.

4. The method as recited in claim 1, wherein the memory areas are configured in such a way that partitions are created and each of the memory areas is assigned to a partition of the partitions.

5. The method as recited in claim 1, wherein the generic macros are configured as a function of pragmas.

6. The method as recited in claim 1, wherein pragma extensions are configured in the generic macros during the course of configuring the generic macros.

7. The method as recited in claim 1, wherein different data arrays for different initialization types are generated in each case for each processor core of the processing unit.

8. The method as recited in claim 7, wherein different data arrays for different initialization values are generated in each case for each initialization type.

9. The method as recited in 1, wherein the specific properties of the generic macros each include an initialization type, according to which the specific memory area may be initialized, and/or an initialization value, using which the specific memory area is to be initialized.

10. The method as recited in claim 1, wherein a consistency between the final macros and the data arrays is checked.

11. A computer-implemented method for generating from a source code an executable code for a processing unit, the method comprising:
compiling the source code;
converting symbolic memory addresses in the compiled code into physical addresses using linker code, the linker code having been generated by:
generating data arrays according to which an initialization of memory areas of the processing unit takes place, the data arrays being generated as a function of predefined pieces of information relating to the memory areas, as a function of a predefined configuration of the memory areas as to which applications are assigned to which of the memory areas, and as a function of a predefined configuration of macros which describe accesses of applications to the memory areas according to specific properties;
generating generic macros, which each describe accesses of a specific application to a specific memory area of the memory areas according to specific properties, the generic macros being generated as a function of the predefined pieces of information relating to the memory areas of the processing unit, as a function of the predefined configuration of the memory areas as to which applications are assigned to which memory areas, and as a function of the predefined configuration of the macros,
generating a final macro for each respective memory unit of the at least one memory unit, the final macro including the generic macros which relate to the memory areas of the respective memory unit, and
generating the linker code as a function of the final macros and as a function of the data arrays; and
generating the executable code as a function of the physical memory addresses and the compiled code.

12. The method as recited in claim 11, wherein the processing unit is a control unit of a vehicle.

13. The method as recited in claim 11, wherein, as a function of the generic macros of the linker code, each symbolic memory address is converted into a physical memory address for the access of a specific application to a specific memory area according to specific properties.

14. A computer-implemented method for operating a processing unit which includes at least one memory unit, which includes at least one memory area in each case, and a processor unit which includes at least one processor core, the method comprising:
executing, in the processing unit, an executable code, the executable code having been generated by:
compiling the source code,
converting symbolic memory addresses in the compiled code into physical addresses using linker code, the linker code having been generated by:
generating data arrays according to which an initialization of memory areas of the processing unit takes place, the data arrays being generated as a function of predefined pieces of information relating to the memory areas, as a function of a predefined configuration of the memory areas as to which applications are assigned to which of the memory areas, and as a function of a predefined configuration of macros which describe accesses of applications to the memory areas according to specific properties,
generating generic macros, which each describe accesses of a specific application to a specific memory area of the memory areas according to specific properties, the generic macros being generated as a function of the predefined pieces of information relating to the memory areas of the processing unit, as a function of the predefined configuration of the memory areas as to which applications are assigned to which memory areas, and as a function of the predefined configuration of the macros,
generating a final macro for each respective memory unit of the at least one memory unit, the final macro including the generic macros which relate to the memory areas of the respective memory unit, and
generating the linker code as a function of the final macros and as a function of the data arrays;
generating the executable code as a function of the physical memory addresses and the compiled code.

15. The method as recited in claim 14, wherein the processing unit is a control unit of a vehicle.

16. The method as recited in claim 14, wherein, due to the executable code, applications access specific memory areas according to specific properties in each case, these specific memory areas being addressed using physical memory addresses, which were generated in the executable code with using the linker code.

17. A first processing unit configured to generate a linker code for a generating process for generating from a source code an executable code that is for a processing unit, the processing unit includes at least one memory unit, which each includes at least one memory area, and a processor unit which includes at least one processor core, the first processing unit configured to:
generate data arrays according to which an initialization of memory areas of the processing unit takes place, the data arrays being generated as a function of predefined pieces of information relating to the memory areas, as a function of a predefined configuration of the memory areas as to which applications are assigned to which of the memory areas, and as a function of a predefined configuration of macros which describe accesses of applications to the memory areas according to specific properties;

generate generic macros, which each describe accesses of a specific application to a specific memory area of the memory areas according to specific properties, the generic macros being generated as a function of the predefined pieces of information relating to the memory areas of the processing unit, as a function of the predefined configuration of the memory areas as to which applications are assigned to which memory areas, and as a function of the predefined configuration of the macros;

generate a final macro for each respective memory unit of the at least one memory unit, the final macro including the generic macros which relate to the memory areas of the respective memory unit; and generate the linker code as a function of the final macros and as a function of the data arrays.

18. A non-transitory machine-readable memory medium on which is stored a computer program for generating a linker code for a generating process for generating from a source code an executable code that is for a processing unit, the processing unit includes at least one memory unit, which each includes at least one memory area, and a processor unit which includes at least one processor core, the computer program, when executed by a computer, causing the computer to perform the following steps:

generating data arrays according to which an initialization of memory areas of the processing unit takes place, the data arrays being generated as a function of predefined pieces of information relating to the memory areas, as a function of a predefined configuration of the memory areas as to which applications are assigned to which of the memory areas, and as a function of a predefined configuration of macros which describe accesses of applications to the memory areas according to specific properties;

generating generic macros, which each describe accesses of a specific application to a specific memory area of the memory areas according to specific properties, the generic macros being generated as a function of the predefined pieces of information relating to the memory areas of the processing unit, as a function of the predefined configuration of the memory areas as to which applications are assigned to which memory areas, and as a function of the predefined configuration of the macros;

generating a final macro for each respective memory unit of the at least one memory unit, the final macro including the generic macros which relate to the memory areas of the respective memory unit; and generating the linker code as a function of the final macros and as a function of the data arrays.

* * * * *